April 11, 1961  E. WILDHABER  2,978,964
METHOD AND APPARATUS FOR CUTTING GEARS
Filed Dec. 2, 1954  6 Sheets-Sheet 1

*INVENTOR:*
E. WILDHABER
BY *B. Schlesinger*
  *Attorney*

April 11, 1961  E. WILDHABER  2,978,964
METHOD AND APPARATUS FOR CUTTING GEARS
Filed Dec. 2, 1954  6 Sheets-Sheet 2

*INVENTOR:*
E. WILDHABER
BY
*Attorney*

April 11, 1961     E. WILDHABER     2,978,964
METHOD AND APPARATUS FOR CUTTING GEARS
Filed Dec. 2, 1954     6 Sheets-Sheet 3

*INVENTOR:*
E. WILDHABER
BY
*Attorney*

INVENTOR:
E. WILDHABER

April 11, 1961  E. WILDHABER  2,978,964
METHOD AND APPARATUS FOR CUTTING GEARS
Filed Dec. 2, 1954  6 Sheets-Sheet 5

INVENTOR:
E. WILDHABER
BY
Attorney

April 11, 1961  E. WILDHABER  2,978,964
METHOD AND APPARATUS FOR CUTTING GEARS
Filed Dec. 2, 1954  6 Sheets-Sheet 6

INVENTOR:
E. WILDHABER
BY
*B. F. Schlesinger*
Attorney

United States Patent Office 2,978,964
Patented Apr. 11, 1961

2,978,964
METHOD AND APPARATUS FOR CUTTING GEARS

Ernest Wildhaber, 124 Summit Drive, Rochester 20, N.Y.

Filed Dec. 2, 1954, Ser. No. 472,621

24 Claims. (Cl. 90—5)

The present invention relates to a method and apparatus for cutting teeth on gears, couplings, and other toothed articles, and more particularly to a method and apparatus for cutting gears, couplings and other toothed articles, in which the cutting edge of the cutting tool describes the entire side surface of a tooth in one sweep across the face of the blank. In a still more specific aspect, the invention relates to a method and apparatus for cutting longitudinally curved teeth on tapered ring gears, such as spiral beveled and hypoid gears used in the final drives of automobiles and trucks, where, as stated, the cutting tool describes the entire side surface of a tooth as it moves across the face of the gear blank. Such gears are already known, and hereinafter will be called "form gears." The pinion, which is to run with a form gear, is generated, and will be called hereinafter an "F-pinion."

With conventional methods of cutting formed, longitudinally curved tooth tapered gears, such as spiral level and hypoid gears, both sides of the teeth of the ring gear are cut simultaneously; but the two sides of the teeth of the mating pinion are cut, one side at a time, in separate operations. This is true when the spiral bevel or hypoid gears are cut with face-mill type cutters, and on hpyoid gears it is also true when the hypoids are cut with face type hobs. However, where a face hob is employed, ordinarily both the gear and the pinion are generated. Formed spiral bevel and hypoid automotive gears are usually cut with face mills.

A face hob has its cutting blades arranged in groups, usually in pairs. A face hob is rotated continuously in engagement with a blank, which is also rotated continuously and in timed relation with the hob so that the different groups of cutting blades of the hob cut in different tooth spaces of the blank successively as the hob and blank rotate in timed relation together. A face mill has its cutting blades arranged in a circle about the cutter axis and in line with each other. When a face mill is used, the work is held against rotation during cutting, except for its generating rotation, if the gear is being generated, and ordinarily a tooth space is cut to its full depth, and then the blank is indexed to position it for cutting of the next tooth space.

One object of the present invention is to provide a method and apparatus whereby both sides of the teeth may be cut simultaneously both on the formed, tapered ring gear and on the mating, generated pinion.

Another object of the invention is to provide a method and appaartus whereby both sides of the teeth may be cut simultaneously both on the formed, tapered ring gear and on the F-pinion in either a face-milling or a face-hobbing process.

Another object of the invention is to provide a method for cutting both sides of the teeth simultaneously on a formed gear or other toothed article with tapering tooth bottoms in either a face-milling or a face-hobbing process.

Another object of the invention is to provide a method and apparatus whereby both sides of the teeth may be cut simultaneously both on the formed ring gear and on the F-pinion at any given tooth proportions in either a face milling or a face-hobbing process without necessitating undue depthwise taper of the teeth from end to end.

A related object of the invention is to provide a method and appaartus for cutting both sides of the teeth simultaneously both on the formed ring gear and on the F-pinion at any given tooth proportions, in either a face-hobbing or a face-milling process, without necessitating undue depthwise taper of the teeth, and while permitting cutting changes to be made on each side of the teeth directly without affecting the other side.

Another object of the invention is to provide a method and apparatus for cutting form gears, in which both sides of the teeth are cut simultaneously, and in which the teeth are first all rough-cut, and are then finished in a single continuous operation and with the same cutters, and in which the finish cutting edges are kept free of heavy chip loads during roughing.

Another object of the invention is to provide an improved method and apparatus for cutting longitudinally curved tooth tapered gears in which both sides of the teeth of both the ring gear and the mating pinion can be cut simultaneously, and in which both sides of the teeth of the pinion, at least, can be cut simultaneously with a single cutter.

Another object of the invention is to provide a method and apparatus of the character described in which the form gears are cut from the solid, and in which nevertheless the final finishing cut is applied in such a way as to provide an excelent tooth surface finish.

Other objects of the invention will be apparent hereinafter from the specification and from the recital of the appended claims.

With the method of the present invention, both sides of the teeth of the form gear are cut simultaneously, but instead of employing a single face mill or a single face-hob having opposite side finishing edges for this purpose, as would be the case in conventional practice, two face mills or two face hobs are used. One tool has finish-cutting edges for finishing one side of the gear teeth and the other tool has finish cutting edges for finishing the opposite sides of the teeth. Furthermore, the two tools may have different diameters so as to cut different lengthwise curves on the teeth. In this way the opposite sides of the teeth of the form gear can be made to mismatch longitudinally the lengthwise tooth curves of the F-pinion so that gear and pinion mesh with localized tooth bearing as is required in automotive gears. With this method of cutting the form gear, both sides of the teeth of the F-pinion can be cut simultaneously with a single face cutter in a generating operation. Thus, with the present invention, both sides of the teeth of both gear and pinion can be cut simultaneously as desired, thereby materially reducing production time as compared with conventional production methods. In cutting the gear both cutters are preferably fed in an inclined direction so that each cutter follows more the side of the tooth, which it is intended to finish, than the opposite side. In this way the finish cutting edges of the cutter are saved for the finishing cuts which are taken preferably after the cutters reach full depth cutting engagement with the blank.

Reference will be made now first to the embodiment of the invention shown in Figs. 1 to 3 inclusive. Here the tapered form gear 30 has teeth 31 of uniform depth from their inner ends 32 to their outer ends 33. Such a gear may be cut according to one embodiment of the present invention with two face hobs 34 and 35. In operation the two hobs are rotated continuously on their respective axes 43 and 56 in engagement with the work 30 while the work is rotated on its axis 57 continuously in timed relation to the rotations of the hobs.

Hob 34 has its cutting blades arranged in pairs 41, each pair comprising an outside cutting blade 37 and an inside cutting blade 42. The finish cutting edges of the blades 37 are denoted at 36; and the inside cutting edges of the blades 42 are designated 39. The inside edges 39 do not finish cut. Hob 35 also has its blades arranged in pairs 51, each pair comprising an outside cutting blade 52 and an inside cutting blade 40. The finish cutting edges of the blades 40 are denoted at 38 and the outside cutting edges of the blades 52 are denoted at 48.

The two hobs are rotated in such timed engagement with the rotating workpiece that successive pairs of blades of each hob enter successively different tooth spaces of the work. The two hobs finish opposite tooth sides of the gear 30, respectively.

In the theoretical case where the teeth of the gear and pinion have zero ease-off, that is, where they have contact along the full length of their teeth, the two hobs 34 and 35 would have equal diameters and could be duplicates. Each hob could finish with both its inside and its outside cutting edges if so desired. The mating pinion would then be generated with a hob which is a counterpart of the gear hob, as is known. The pinion blank is set in the same position as the pinion, the hob, which is used in cutting it, representing the gear. The rotating pinion hob would then describe exactly the same tooth surfaces relative to the gear as the gear hob, but from the other side. Simultaneously a slow generating motion is provided between the pinion blank and the gear represented by the rotating hob, as though the pinion were running with its gear. Thereby the tooth surfaces of the pinion are generated exactly conjugate to those of the gear.

In the actual cases, the generation of the pinion remains the same as just described. The two hobs of somewhat different diameters are however provided on the gear, one larger than the pinion hob, and one smaller. The larger hob contains outside cutting edges, while its inside blades are either thinned down or differently positioned so that they do not have finishing contact in the final feed position. The smaller hob contains inside finishing edges.

Figure 2:
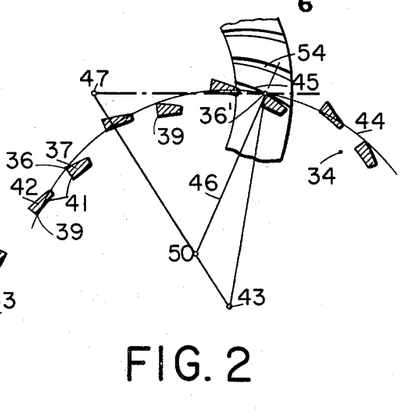
Fig. 2 is a fragmentary section on the line 2—2 of Fig. 1 looking in the direction of the arrows, and showing somewhat diagrammatically a portion of the gear and the cutting blades of one of the face hobs employed in cutting the gear, the hob shown having outside finish-cutting edges.
Figure 3:
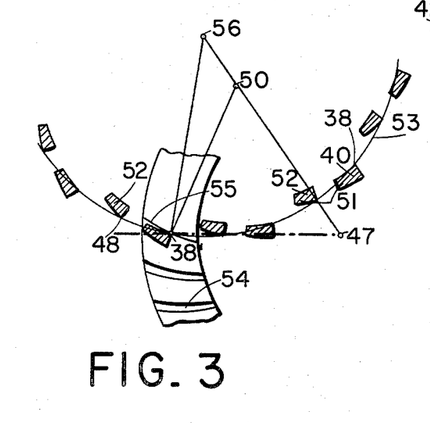
Fig. 3 is a section similar to Fig. 2 but showing the other hob, namely, the hob, which has inside finishing edges, in engagement with the gear.

In Fig. 2 circle 44 is drawn through the intersection point 36' of each outside cutting edge 36 with the sectional plane perpendicular to the hob axis. Likewise, the circle 53 (Fig. 3) is drawn through the intersection point 38' of each inside finishing edge 38 with a plane perpendicular to the hob axis. Fully matched teeth are obtained when the circles 44 and 53 have equal diameters, and when, for instance, the intersection points of the cutting edges of each hob are equally spaced from one another in cutting teeth of constant depth. The blade spacing may also be kept the same on the hobs 34 and 35 of unequal diameter.

The use of two separate hobs, one for each side of the teeth, makes it possible to adapt the design of each hob to the tooth side which it is to finish. Thus, ease-off at the tooth ends can readily be accomplished by employing a pair of hobs of slightly different diameters. In this way a gear can be cut which will run with its mating F-pinion with lengthwise localization of tooth bearing as is required in automotive gears in order to take care of variations in loads and mountings. The hob 34 has its outside finish-cutting blades 37 positioned, therefore, at a greater distance from its axis 43 than the inside finishing edges 38 of the hob 35 are from the axis 56 of the latter hob. Thus, hob 34 cuts a concave arc 45 (Fig. 2) of larger curvature radius than that of the convex arc 55 cut by the hob 35 containing the inside finishing cutter edges.

The blades of the two hobs are preferably made to be adjustable radially of the hob axes in known manner as described, for instance, in U.S. Patent No. 1,249,378, granted December 11, 1917. With hobs having radially adjustable blades, small cutting changes, including diameter changes, as commonly employed to counteract hardening distortion, can be made independently on the two sides of the teeth. At present such cutting changes are made on the pinion, whose opposite tooth sides are cut in different operations. With the present invention both sides of the pinion teeth can be generated in one operation while still retaining the independent cutting changes on opposite sides of the teeth, these changes being made on the form gear in the method of the present invention, instead of on the pinion.

The two face hobs or face mills are employed for cutting the gear because it is not feasible to cut opposite sides of the teeth of a generated gear or pinion with a pair of face type cutters in a single generating operation. The machine parts would interfere with each other. Sometimes even the cutters would interfere with each other. By cutting opposite sides of the teeth of the form gear, however, with face type cutters, both sides of the teeth of the pinion can be cut simultaneously with a single cutter. In this way both sides of the teeth of both gear and pinion can be cut simultaneously.

Conditions are more favorable, however, for cutting the gear with face hobs than with face milling cutters. Figs. 2 and 3 show the reason why it is preferable to use face hobs in the present invention. The cutting blades of the hob 34 are inclined from front to back to any circle, such as circle 44, concentric with the hob axis 43, and they produce as they move across the face of the continuously rotating gear blank, a lengthwise tooth curve 45 whose normal 46 is offset from the hob axis 43. This contrasts with a face mill cutter which will have its cutting blades concentric with its axis and which will have its axis on the normal to the lengthwise tooth curve. In other words, for cutting a circular arc approximating the tooth curve 45 produced by the face hob, the axis of the face mill would have to be near 50 on the normal 46 to the curve 45. With face hobs, the hob axis 43 lies further away from the gear apex 47 and the hob blades keep at a larger distance clear from the apex 47 for that reason. A circle centered on the normal 46 near the point 50 has a smaller distance from apex 47 than circle 44. To avoid interference between the two cutters it is essential that the apex 47 be kept well clear of the path of the blades.

The teeth produced in the described way have a natural lengthwise taper, that is, the taper is equally distributed on both members of the gear pair. Tapered tooth bottoms are produced as indicated at 54 in Figs. 2 and 3.

Figure 1:
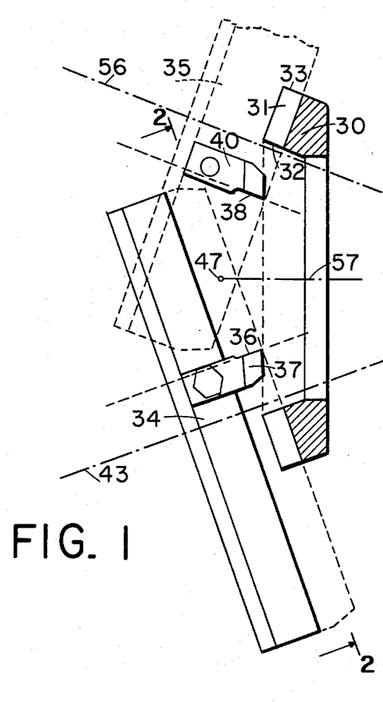
Fig. 1 illustrates one embodiment of the invention, showing a pair of face hobs cutting teeth of constant depth from end to end in a tapered ring gear.

Fig. 1 shows the face hobs in such position that their axes 43 and 56, respectively, are parallel to the plane of the drawing, which contains the axis 57 of the gear 30. Axis 43 and most of hob 34 is below the drawing plane. Axis 56 is above it. In operation, as stated, the gear 30 and face hobs 34 and 35 are rotated in timed relation at the inverse ratio of the number of gear teeth and the number of blade groups in a hob. Relative depthwise feed of the gear teeth is provided to attain the final feed position in Fig. 1. The depthwise feed is preferably made up of a component in the direction of the axis 57 of the gear and of a further component. The latter is preferably obtained by changing the timing between the hob and the gear as the feed progresses. This timing change is individual for each hob, and usually is different on the two hobs, so that each hob follows more the side of the teeth which it is intended to finish, than the opposite side. In this way the finishing edges take a lighter cut on the side they are going to finish and are saved for the finishing cut.

It is understood that the normal 46 (Fig. 2) at mean point 36' is obtainable as the connecting line of points 36' and 50. The latter lies on the line 47—43 in the plane of the drawing. Its distances 47—50 and 50—43 are in a proportion of a virtual tooth number N' of the gear and of the number of starts or blade groups 41 of the hob.

$$N' = \frac{N}{\sin \Gamma}$$

where N denotes the number of gear teeth and $\Gamma$ is the pitch angle of the gear, that is, the inclination of its axis to the drawing plane. The normal of Fig. 3 may similarly be determined.

Figure 4:
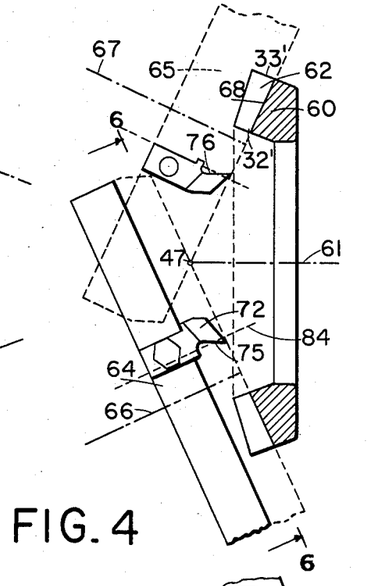
Fig. 4 is an axial section, similar to Fig. 1, showing another embodiment of the invention in which a pair of face hobs are employed to cut simultaneously opposite sides of the teeth of a ring gear with teeth tapering in depth from their inner to their outer ends.

Figs. 4 to 9 illustrate an application of my invention to the production of tapered form gears having teeth of tapering depth. A pair of face-type cutters are provided and positioned at opposite sides of the blank axis. In the case illustrated, the cutters are face hobs. In Fig. 4, the gear blank 60 with its axis 61 has teeth 62 which increase in depth from the inner end 32' to the outer end 33'. Two face hobs 64, 65 are positioned to engage the gear blank simultaneously. In this view they are shown with their axes 66 and 67 parallel to the plane of the drawing. The path of the tips of the blades is tangent to the desired root surface 68 of the gear.

Figure 5:
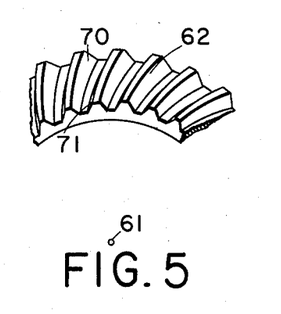
Fig. 5 is a fragmentary view of a tapered, formed gear such as may be produced in accordance with the present invention.

A gear cut by the method of the present invention is shown in Fig. 5 fragmentarily in a view along its axis. In this axial view the concave sides 70 of its teeth 62 appear as having a much larger area than the convex sides 71 which are partly visible. It is seen, therefore, that the depthwise feed along the gear axis alone would not give a balanced cut, and that the hob timing will have to be changed differently on the two hobs to obtain a balanced cut and to have each hob follow more the one side of the teeth which it is to finish.

Figure 6:
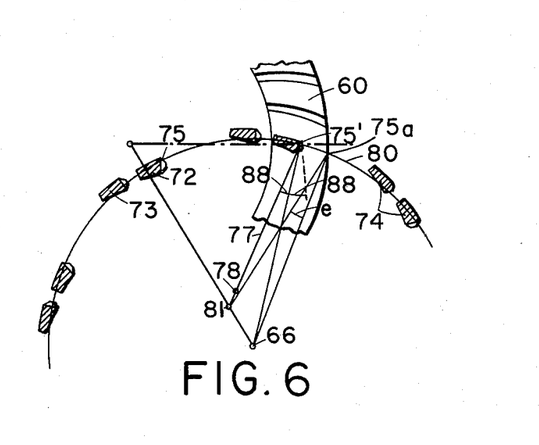
Fig. 6 is a section along the line 6—6 of Fig. 4, illustrating somewhat diagrammatically the operation of one of the cutters, namely, the cutter having outside finishing edges.

As well known in the art, tapering tooth depth requires a different blade arrangement on the hob 64 or 65 from that which would be employed were the tooth depth constant from end to end. The outside blade 72 (Fig. 6) and the inside blade 73, which cut in the same tooth space must be moved together, that is, approached to each other as compared with the blades of hobs 34 and 35 for cutting teeth of constant depth. There is a larger gap between the blade groups 74. Otherwise, the face hobs 64 and 65 are similar to the hobs 34 and 35. Hob 64 has blades with outside finish cutting edges 75, and has a somewhat larger diameter than hob 65 whose finish-cutting blades have inside finish-cutting edges 76. This is to attain ease-off lengthwise of the teeth of the gear. Fig. 6 shows the blade arrangement of the face hob 64 which has outside finish-cutting edges 75, while Fig. 7 refers to the hob 65 with inside finish-cutting edges 76. The latter hob has inside finish-cutting blades 73' and outside cutting blades 72'.

With teeth of tapering depth, there is an additional problem, which shows up with both milling cutters and hobs, as known. The milling cutters describe conical surfaces as they rotate; and the axes of these surfaces are inclined to one another in order to produce corresponding taper in tooth depth on the gear and pinion. Hence, the straight line elements of these conical surfaces do not coincide on the pinion and gear cutters. Without correction, the result is a tooth bearing which extends in a ribbon at an angle across the mating tooth surfaces of the gear and pinion. This bearing is called bias bearing. The same undesirable condition exists also when face hobs are employed. Even though the gear teeth may contact properly at the mean point and have matching pressure angles there, the pressure angles of the pinion and gear do not match all along the mating tooth surfaces. They differ increasingly with increasing distance from the mean point.

This condition can be corrected through a modified generation of the pinion. When both sides of the pinion teeth are generated in the same operation, there is only one such known remedy to avoid bias bearing with rotary face type cutters having straight cutting edges. It consists in introducing an additional motion in the generation of the pinion, a motion along the axis of the gear represented by the cutter.

Bias correction

I have discovered a novel way of avoiding bias bearing, a way which does not require an additional motion. It applies to face hobbing only.

Figure 7:
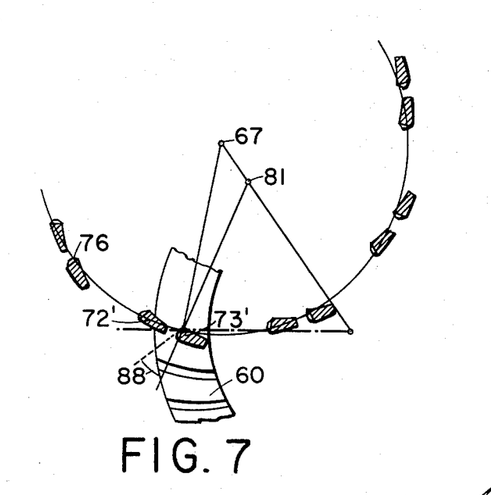
Fig. 7 is a view similar to Fig. 6 but illustrating the action of the other hob, namely, the hob having inside finish cutting edges.

What is required to avoid bias bearing is a change of pressure angle along the teeth from what it would be without correction. It is best explained at first with the plane or two-dimensional problem. Accordingly, we shall assume at first that the gear sectors 60 in Figs. 6 and 7 represent crown gears rather than tapered gears, and that their common axis is perpendicular to the drawing plane, like the axis 66 or 67 of the respective hob.

Mean point 75' of the hob 64 (Fig. 6) moves relative to the gear 60 at right angles to the normal 77 and describes a curve thereon (not shown) whose curvature center is at 78 on the normal 77. Its location can be determined by known construction. The absolute path of point 75' is, of course, a circle 80 about the hob axis 66.

81 denotes the instantaneous axis of relative motion between the crown gear and the hob, and can be determined as such. All normals to the relative path of hob point 75' are known to pass through the instantaneous axis 81. Thus, when the hob point has moved to the position 75a at the outside end of the crown gear, line 75a—81 is normal to its relative path. It includes an angle e with hob radius 66—75a. This angle increases from the inner ends of the gear teeth to their outer ends.

Figure 8:
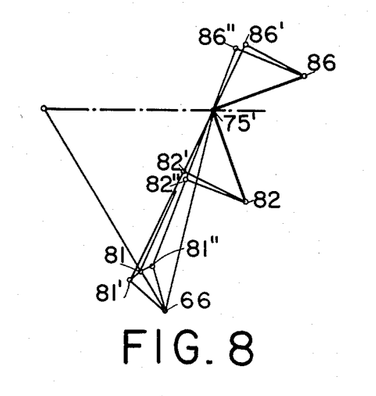
Fig. 8 is a diagram explanatory of a principle used in the present invention when cutting teeth of tapering depth.

In accordance with my invention the variation of this angle e is used to obtain a desired change of pressure angle along the teeth. The change of the angle is best seen when its leg 75a—81 and hob radius 66—75a are turned about the hob axis until the hob radius 66—75a coincides with hob radius 66—75'. In this motion, the point 81 moves in a circle about the hob axis 66 through the above turning angle. This is indicated in Fig. 8. Point 81 has moved to position 81' about axis 66. The angle 66—75a—81 of Fig. 6 then appears as angle 66—75'—81'. It is seen to be larger than angle 66—75'—81. The angle 66—75'—81" corresponds to the inside end of the teeth and is seen to be smaller than angle 66—75'—81.

Now let us consider an outside cutting edge suitably inclined to the drawing plane to correspond to the desired normal pressure angle; and let 75'—82 be its projection to the drawing plane (Fig. 8), or more specifically the projection of its tangent at mean point 75'. This cutting edge has, of course, a constant position with respect to the hob radius 66—75'. But it traces a curve of changing direction. At the outer end of the teeth the curve is perpendicular to normal 81'—75'. At the inner end it is perpendicular to normal 81"—75'. In Fig. 8 lines are drawn through point 82 of the tangent to the cutting edge perpendicular to the said normals, thus obtaining points 82', 82" on the normals at different distances from point 75'. It is readily seen that these distances 75'—82' and 75'—82" are proportional to the trigonometric tangents of the normal pressure angles produced in the end positions. Accordingly with this showing the produced normal pressure angle increases from the large end of the teeth to the small end, its trigonometric tangents being proportional to distances 75'—82' and 75'—82". The pressure angle produced on the mating convex sides of the pinion teeth is known to increase also from the large end of the teeth to their small end, when no correction is used. By properly choosing the angle 81—75'—82 the increase in pressure angle on the gear can be made equal to the increase on the pinion. Pressure angles are then matched. The teeth are capable of contacting in their lengthwise direction, and bias bearing is avoided.

Figure 9:
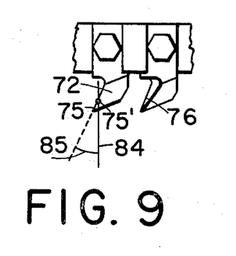
Fig. 9 is a fragmentary front view of one form of face hob for cutting teeth of tapering depth on a form gear in accordance with the present invention.

The cutting edge of the hob then has to be inclined to the normal plane 81—75', that is, to the plane laid through the normal perpendicular to the drawing plane. This normal plane is also perpendicular to the direction of the hob-cutting blades at their middle portion, at midheight. It means that a front rake should be provided on the cutting teeth. In order to have a positive front rake rather than a negative one, the hob may be designed to cut from the small end of the gear teeth to the large end. This is indicated in Figs. 6 and 7. The front cutting face at 75' of the hob blade is then nearer the hob axis 66 than the rear end of the cutting blade. The outer end of the outside cutting edge projects forwardly from a plane laid through its middle portion perpendicular to the lengthwise direction of the cutting tooth or blade. This is indicated in Fig. 9 which shows the outside cutting edge 75 of a blade 72 of hob 64 projecting forwardly with reference to a plane 84 laid through the middle portion 75' of the cutting edge 75 perpendicular to the lengthwise direction of the blade. The outside cutting edge 75 appears inclined at an angle 85 to this plane 84. The blade 72 has, therefore, a distinct hook.

Conditions are similar for the inside blade and for the inside finishing edge of the other hob 65. Here we consider a direction of the cutting edge such that its tangent is projected into line 75'—86 in Fig. 8. Again we project the end point 86 to the respective normals, thus obtaining points 86', 86" thereon. 86' corresponds to the large end of the teeth; 86" to the small end. Here now distance 75'—86' is larger than 75'—86". This means that the trigonometric tangents of the normal pressure angle, and the normal pressure angle itself, decrease from the large end to the small end. This is exactly what is desired on that side; for on a pinion cut without correction the pressure angle decreases from the large end of the teeth to the small end. Accordingly matching pressure angles, that is, bias correction, can be obtained by a proper inclination of the cutting edge, an inclination which gives the same change of pressure angle as exists on the pinion. This is obtained with an inside cutting edge 76 (Fig. 9) also projecting forwardly, that is, having a hook.

When all the bias correction is made on the gear, the finishing edges of the pinion cutter should lie in the normal plane, that is, in the plane corresponding to 75'—81 in Figs. 6 and 8. The pinion hob then contains blades without front rake.

Instead of using the correction wholly on the gear, it can also be used wholly on the pinion; or it can be split up between the gear and pinion. In the latter case, the blades of both the gear hob and the pinion hob have front rake.

This form of bias correction is also applicable in the case of gear pairs where both members are generated.

Thus far, crown gears have been considered rather than tapered gears. However, the conclusions apply to tapered gears just as well. Exact computations can be made by applying the laws of three-dimensional mathematics. Besides, closely approximate results are obtained by computation as if for crown gears, in the manner described. Here, also, a change of pressure angle lengthwise of the teeth is attained by having forwardly projecting finishing edges. The cutting edges appear inclined at an angle 88 to the normal plane in a view along the hob axis, Figs. 6 and 7. These views correspond directly to Fig. 8.

Cutter relief

Figure 10:
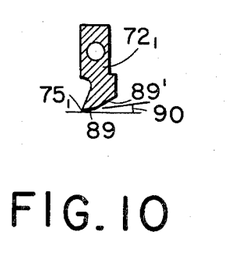
Fig. 10 is a longitudinal section in a median plane of a modified form of hob blade.

Sometimes the relief on the cutting blades is a problem with face hobbing. If an excessive top relief is required to maintain a constant width of the blade at its outer end, this decreases the blade life. A reduced top relief may in this case, however, be put on each blade immediately behind its cutting face. This is indicated in Fig. 10 where the blade $72_1$ is shown as having a top portion 89 of reduced top relief immediately back of its end cutting edge $75_1$, and as having a portion 89' of customary top relief behind portion 89. 90 denotes the reduced angle of top relief of portion 91. This angle is put on after relieving and is renewed from time to time during the life of the hob.

The feed

Figure 11:
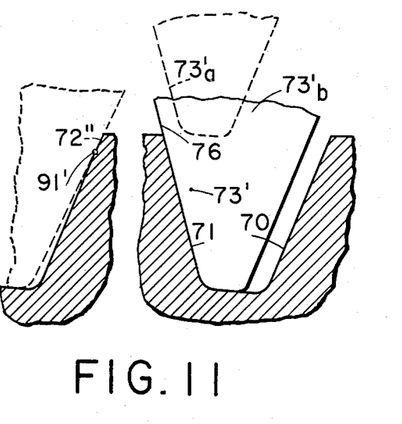
Fig. 11 is a fragmentary sectional view on an enlarged scale showing in section two tooth spaces of a form gear having tapering depth teeth, and illustrating at the right the relative feed path of a blade of one hob from a position of non-engagement to full line finishing position, and illustrating at the left how a blade of the same hob may put a chamfer on the opposite side of the tooth space from the one that is finished by this hob.
Figure 12:
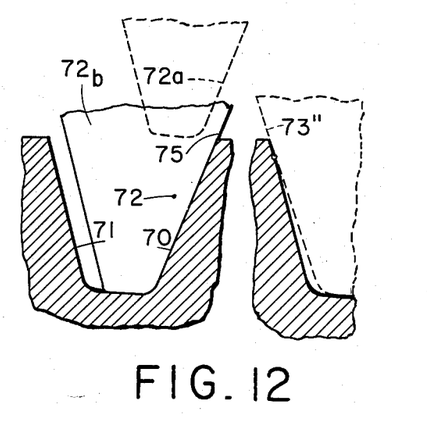
Fig. 12 is a similar view illustrating at the left the path of a blade of the other hob in finishing the said opposite side of the tooth space of the gear, and illustrating at the right how a blade of this same hob may put a chamfer on the tooth side opposite the one finished by this hob, namely, on the tooth side finished by the hob of Fig. 11.

Fig. 11, right, and Fig. 12, left, show how opposite sides 70, 71 (Fig. 5) of a tooth space are cut with a pair of hobs 64, 65 having outside finish cutting edges 75 and inside finish cutting edges 76, respectively. Each hob is fed depthwise relative to the work so that it follows more the side it finishes than the opposite side. Thus, the hob 64 with finish-cutting blades 72 is fed from a position 72a (Fig. 12), shown in dotted lines, to the full depth position 72b shown in full lines. It keeps closer to the side 70 which it is to finish. Likewise, the hob 65 with the inside finish-cutting blades 73' is fed from a position 73'a to the position 73'b shown in full lines where it finishes side 71 of the tooth space. Through this method of feed, the larger part of the cutting load of the side cutting edges is carried by roughing edges; and the finishing edges are saved for finishing. The described feed applies both to teeth of constant depth and to teeth of tapering depth.

Chamfering top edge

Figure 13:
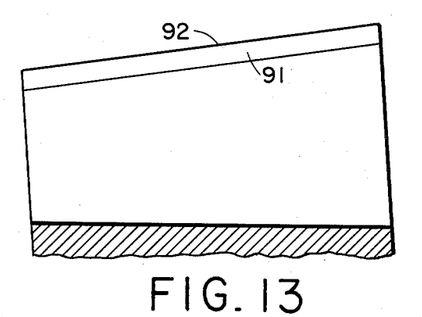
Fig. 13 is a view on an enlarged scale looking at the side of one of the teeth of the gear and showing the desired chamfer following the top edge of the tooth.

It is sometimes desirable to chamfer very slightly the top edges of the gear teeth so that the chamfer 91 follows the tooth top 92, see Fig. 13. This presents a problem only when the teeth taper in depth from end to end as shown.

On teeth of constant depth this chamfer may readily be applied by suitably shaping the cutting edge. The cutting edge is then provided with an inclined chamfering portion at the proper depth so that the edge conforms to the desired cross section of the tooth profile including the chamfer.

On teeth of tapering depth such a chamfer may be applied in accordance with the present invention by specially positioned hob blades. The hob 64 with outside finishing blades 72 (Fig. 15) is provided with inside blades 73" adapted to chamfer the opposite side of the teeth, so that it finishes the longitudinally concave sides of the teeth and chamfers the longitudinally convex sides. The hob 65 with inside finishing blades 73' is provided with outside chamfering blades 72" so that it finishes the longitudinally convex sides of the teeth and chamfers the concave sides. This is indicated in Fig. 11, left, where the chamfering blade 72" is indicated in dotted lines in full depth position. The chamfer 91 starts at point 91'. Fig. 12, right, illustrates the chamfering of the longitudinally convex sides with a chamfering blade 73" of a hob having outside finishing blades 72. A chamfering blade has a pressure angle increased over the pressure angle of the side edges of the blades which cut the rest of the profile of the corresponding sides of the teeth, to match and produce the chamfer. The difference in pressure angle may be quite small, as little as two degrees, if the chamfer is to replace an extra relief at the root of the pinion teeth.

The required positions of the chamfering blades will now be described with reference to Figs. 14 and 15. These figures show sections similar to Figs. 7 and 6, respectively, with Fig. 15 turned around in the same position as Fig. 14. The latter can also be considered a section along the line 6—6 of Fig. 4.

Figure 14:
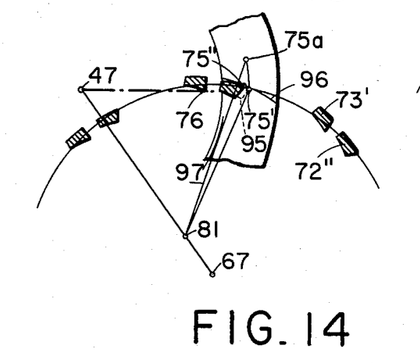
Fig. 14 is a part section, part view, similar to Fig. 7, illustrating the simultaneous cutting and chamfering, respectively, of opposite sides of a tooth space of tapering depth in a form gear, but showing a hob having inside finish cutting edges and outside chamfering edges, and illustrating further diagrammatically the relationship of this hob to the gear blank.

The hob indicated in Fig. 14 is similar to the hob 65 of Figs. 4 and 7, and contains the same inside blades 73' with inside finishing edges 76. Its outside blades 72" are designed as chamfering blades. If an outside blade of this hob were to cut the sides of the gear teeth, and produce the required tooth direction and normal at the mean point 75', then its cutting face would pass through this point 75'. It would be in the position indicated in dotted lines 95. Its point 75' would describe the tooth curve 96 on the work. The path of the chamfering blade, however, should be inclined to the path of such a blade, so that the produced chamfer follows the tooth top rather than the tooth bottom. It should tend to separate and get further away from the tooth side from the small ends of the teeth to their large ends. To cut in a different direction, as required, the cutting point should not be at 75', but at a different radius. At a larger hob radius, as at 75a, the relative path would have a normal 97 which is the connecting line of point 75a with the instantaneous axis 81, when again substituting a crown gear for the actual nearly flat ring gear. This normal comes closer to the gear apex 47 than normal 81—75', and signifies a larger spiral angle. The chamfering blade 72" should describe a path of increased spiral angle to get further away from the tooth side toward the large end of the teeth. In Fig. 14 its cutting point should therefore be at a larger hob radius than point 75'. To cut the right size of the teeth, it should be on the relative path 96 and at a larger hob radius. It should be at 75". The blade position can be computed as if for a crown gear, using the steps described.

Figure 15:
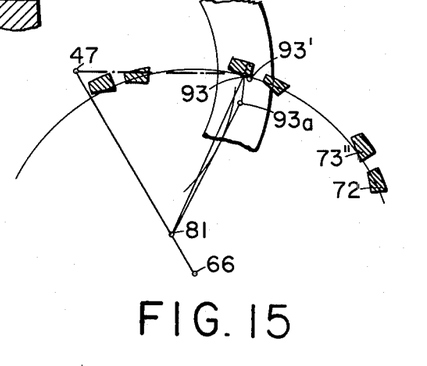
Fig. 15 is a part section, part view, similar to Fig. 14, showing a hob having outside finish cutting edges and inside chamfering edges in engagement with a form gear blank.

The hob with outside finishing blades 72 is shown in Fig. 15. Its inside blades 73" are designed as chamfering blades. If this hob were to finish cut the sides also with the inside blades, rather than to chamfer the tops, the cutting point of an inside blade would be at 93 in the sectional view. To apply a chamfer following the tooth tops with an inside blade, the blade should move slightly away from the tooth side as it moves toward the large end of a tooth. It should move in a relative path of smaller spiral angle; a path whose normal at the mean point has a larger distance from the apex 47 than normal 93—81. This is fulfilled at points of smaller hob radius, as at point 93a, whose normal 81—93a has an increased distance from the gear apex 47. To cut the proper tooth thickness, the cutting point should also lie on the relative path of the point 93. It should be at 93', ahead of point 93. Here, also, the cutting face of the chamfering blade is approached to the cutting face of the finishing blade which cuts the opposite side of the tooth space.

With the method of the present invention, then, the teeth of a form gear are first rough-cut in a way which saves the finishing edges; and they are then finish-cut and chamfered in the same operation.

General remarks

In each of the described procedures the roughing cut is effected during the depthwise feed. This feed preferably comprises a feed in the direction of the work axis and additional feed. The latter is a gradual timing change of each face hob, as the depth feed progresses.

The timing change is different on the two hobs; and such that each hob keeps closer to the side it finishes in all feed positions.

If desired, a different timing change may be provided after the depth feed ceases, to feed the hobs in effect laterally to the finishing position. Also, the end of the depth feed may be the finishing position.

In accordance with a preferred embodiment of my invention the cutting speed is reduced as the finishing position is approached, so that the last few passes of the cutting blades over a tooth are done at much reduced speed. This is to obtain a very smooth surface with the form cut. It is preferably used on steel, but is not necessary on all materials. All the motions are simply slowed down, while their timing remains the same. This is particularly well adapted to hobbing, where all the teeth are first roughed out completely before the finishing cut starts. With hobbing the speed change is required only once in the entire process, and not separately for each tooth, as would be necessary in a face-milling process.

Machine design

Figures 22, 24, 25, 26:
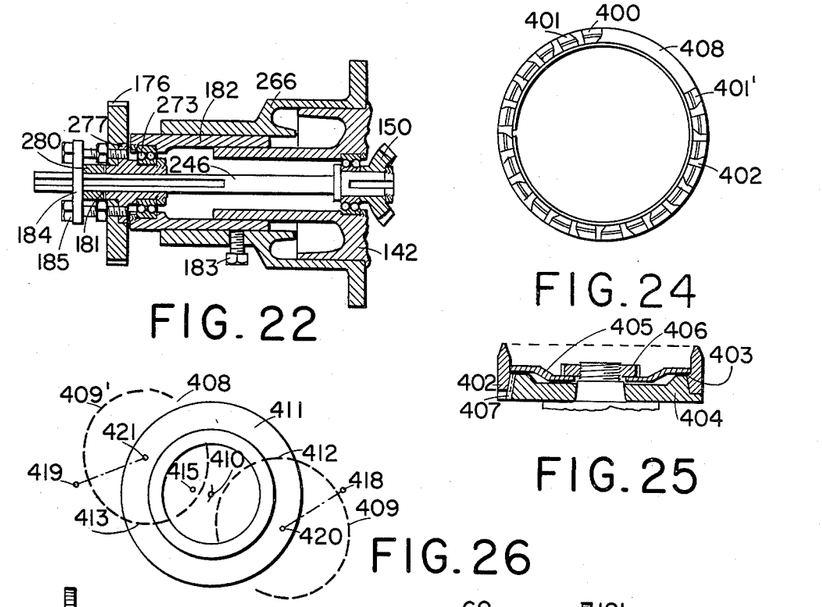
Fig. 22 is a horizontal section of the rear end of a cutter assembly showing a slight modification thereof as compared with Fig. 18.
Fig. 24 is an end view of a face-mill type cutter with a gap, such as may be used in a modification of the invention.
Fig. 25 is an axial section of the cutter shown in Fig. 24, and showing, also, the means for securing this cutter to the cutter spindle.
Fig. 26 is a diagrammatic view, similar to Fig. 21, illustrating one embodiment of the invention and showing a pair of face-mill type cutters in engagement with a gear blank, and indicating also a preferred form of depth feed.
Figure 23:
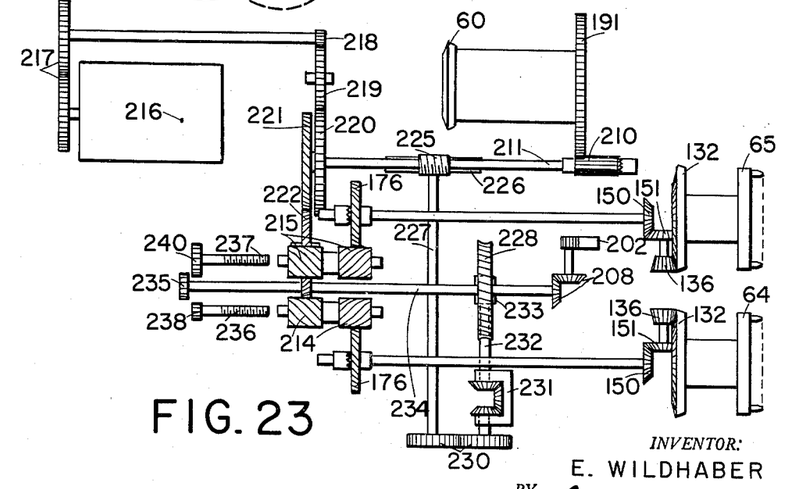
Fig. 23 is a drive diagram of the machine illustrated in Figs. 16 to 21 inclusive.

An embodiment of a machine for practicing the present invention is illustrated generally in Figs. 16 and 17, and Figs. 18 to 21 show details thereof. Fig. 22 is a slight modification of a detail, which may be applied to the same machine to increase its working range. A drive diagram is shown in Fig. 23.

In the embodiment illustrated, the work spindle is horizontal as on a conventional single-cutter, face-mill machine. On such machines a single angular adjustment is provided between the work and the cutter; and there are equivalents of straight line adjustments vertically, laterally, and in the direction of the work axis.

If these known adjustments were provided on a two cutter machine a further adjustment would have to be added, one reason being that the cutting zones of the two cutters cannot be diametrically opposite one another when a gear is to be cut having an uneven number of teeth. Also, one cutter would have to be raised vertically above the work spindle an amount comparable to its radius, while the other cutter would have to be set below the work axis by a comparable amount. This would result in an unfavorable machine design.

In accordance with the present invention, angular adjustment about two pivot axes is provided for each cutter, so that each cutter axis can be set in any desired direction. The two pivot axes intersect in the cutter axis. In other words, each cutter axis can be tilted in any direction about a pivot point lying thereon.

Figures 19, 20, 21:
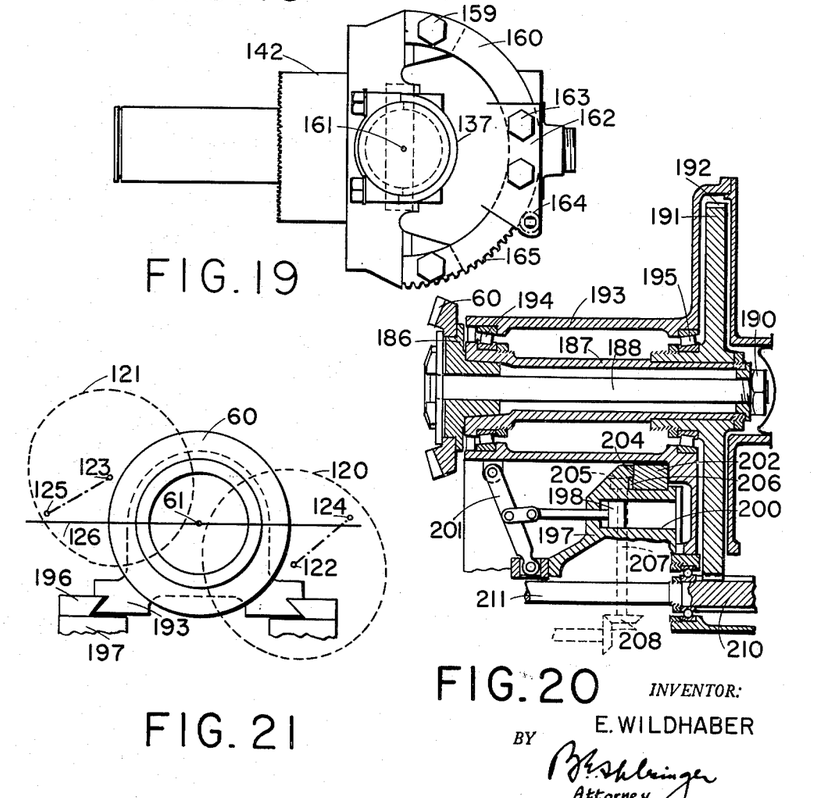
Fig. 19 is a fragmentary side elevation of parts shown in Fig. 18.
Fig. 20 is an axial section on a somewhat enlarged scale in a vertical plane through the work head of the machine shown in Fig. 16.
Fig. 21 is a more or less diagrammatic front view looking at the gear blank along the gear axis and showing fragmentarily a portion of the machine frame, and the work head with a gear blank mounted thereon, and illustrating diagrammatically the positions of the two cutters.

Use is made of this universal adjustment to decrease the vertical setting, so that it is very small instead of being very large and opposite on the two cutters. This is accomplished by turning the whole system of Fig. 1 or of Fig. 4, cutters and work, about the work axis, so that the two pivot points lie close to a horizontal plane containing the work axis. This is indicated in Fig. 21, which is a view taken in the direction of the work axis 61. The work 60 is engaged by two hobs indicated diagrammatically by the circles 120, 121 described by the tops of their finishing blades. 122, 123 are the centers of these circles; and 124, 125 are the pivot points about which the hob axes can be set. The assembly has been turned about the work axis 61 from a horizontal, or nearly horizontal, position of the hob axes to the position shown where the pivot points 124, 125 are close to a horizontal plane 126 containing the work axis 61. The pivot points are both located on the same side of plane 126, namely, above it.

In the machine illustrated, moreover, small and simplified vertical adjustments of the two hobs are provided, which can be made with taper plates. These plates have a limited but sufficient range of adjustment; and they provide a very rigid design.

Figure 16:
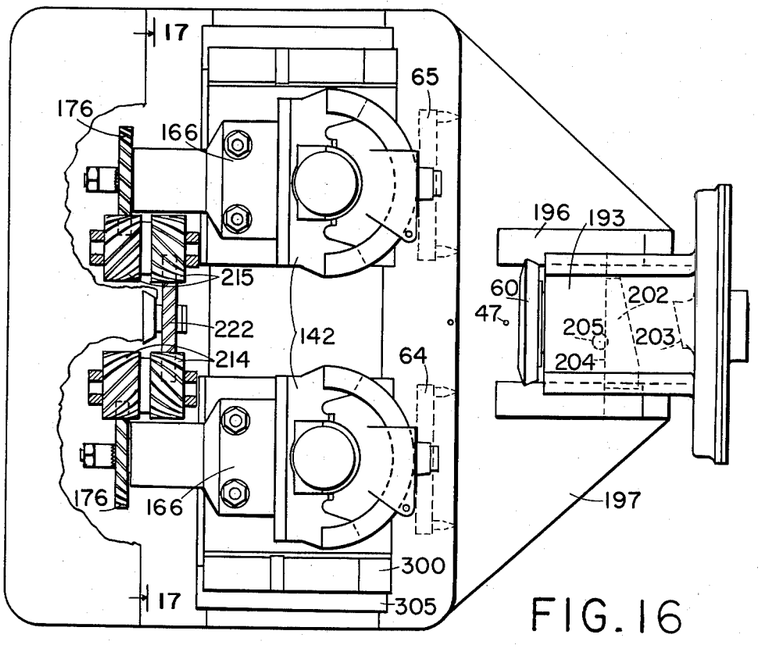
Fig. 16 is a somewhat diagrammatic plan view of a machine constructed according to one embodiment of this invention for finish-cutting form gears from the solid with a pair of face type cutters.
Figure 18:
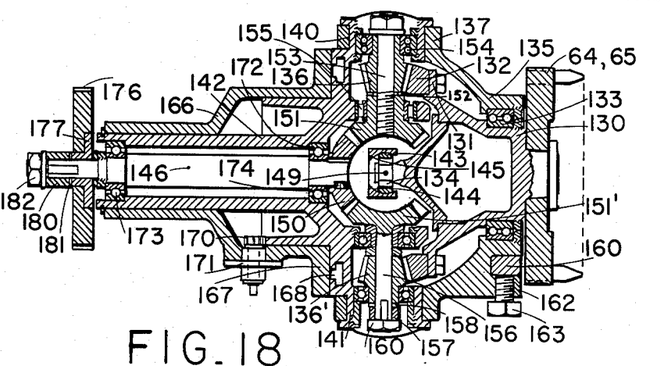
Fig. 18 is a horizontal section on a somewhat enlarged scale of one of the cutter drive assemblies of the machine illustrated in Figs. 16 and 17, the section being taken through the axis of the cutter spindle and its drive gear.

The plan view, of Fig. 16, shows the general arrangement. The hob supports are arranged side by side. Their construction and drive are best seen in Figs. 18 and 19.

Cutter assembly

Each hob or face-type cutter is mounted on a spindle 130 having a flange 131 to which a tapered drive gear 132 is rigidly secured. Spindle 130, which consists of two parts rigidly secured together, as by welding, is rotatably mounted on the ball bearing 133 and a roller bearing 134. The ball bearing 133 is held in a holder 135 which is adjustable about the common axis of two axially-aligned side pinions 136, 136'. These pinions mesh with gear 132. The holder 135 has two opposite arms 137, which contain split bearing portions 140. These surround projections 141 coaxial with said drive pinions and formed on a swivel member 142. The roller bearing 134 contains an outer race 143 with a spherical outside surface, which is supported by a matching inside spherical surface 144 of a portion 145 of the swivel member 142. During adjustment of the holder 135 about the axis of the drive pinion 136, the outside surface of the bearing 143 slides on the spherical inside surface 144 without binding. If desired, the roller bearing 133 may have an outer race with a spherical inside surface, on which the rollers roll directly.

Drive pinions 136 and 136' are driven from a shaft 146 through a miter gear 150 which meshes with miter gears 151, 151'. Gear 151 is rigidly secured to the tapered drive pinion 136 by a conventional toothed face coupling 152. The coupling is held in engaged position by a bolt 153 which threads into gear 151. The unit containing drive pinion 136 and gear 151 is rotatably mounted in two bearings 154, 155 held in swivel member 142.

The gear 151' and pinion 136' are also rotatably mounted on the swivel member 142.

Gear 151' has a long and thin stem 156. Slidably keyed to it at its outer end is a sleeve 157. This sleeve is connected with the hub of the miter pinion 136' through a toothed face coupling 158 having helical tooth sides. A nut 160 threaded to the outer end of the stem 156 serves for exerting axial pressure on the sleeve 157 which, in turn, causes pressure on one side of the clutch teeth. The stem 156 is thereby somewhat twisted and preloaded. The amount of preload is controlled by a suitable position of the clutch teeth on the sleeve.

While the drive pinion 136 contacts one side of the teeth of gear 132, pinion 136' can thereby be made to contact the opposite side of these teeth with a given load, so that both sides of the gear teeth are in contact simultaneously and without backlash.

Which side of the gear teeth the drive pinion 136 should contact depends on the hob, that is, on the direction of rotation of the hob. One sleeve 157 is used for one direction of rotation; and another sleeve is used for the opposite direction of rotation. The two sleeves differ merely in the position of the clutch teeth with respect to the key way.

While the unit 151'—136' is not essential for the operation, it can be used to advantage either to strengthen the drive by transmitting power through the two pinions, or as a means to take out all backlash, as illustrated here.

Rigidly secured to the swivel member 142 by bolts 159 is a circular guide 160 (Fig. 19) extending about the axis 161 of the drive pinions 136, 136' and of the cutter tilt. It extends beneath a projection 162 of the holder 135. Screws 163 threaded into said projection and abutting against guide 160 serve to secure the holder rigidly to the guide and to swivel member 142 in any given position of angular adjustment of the holder. The adjustment can be made by turning a pinion 164, indicated by its pitch circle only (Fig. 19). This pinion is mounted in the projection 162 and engages teeth 165 provided on the outside of said guide.

The swivel member 142 seats in an outer member 166 and can be adjusted thereon about the axis of shaft 146. It can be clamped to member 166 after adjustment by T-bolts (not shown) that pass through flange 167 of member 166 and that engage in a T-slot 168 provided in the swivel member 142. Adjustment is by means of a spur pinion 170 mounted in a flanged portion 171 of member 166. This pinion engages teeth provided on the swivel member 142 and constituting parts of a face gear that is integral with the swivel member. Outer member 166 is angularly stationary.

Accordingly, the hob axis can be adjusted angularly about two axes (the axis of pinions 136, 136' and the axis of shaft 146) which intersect at point 149 on the hob axis. It can be set angularly about this point in any desired direction within the design limits, within a conical surface whose apex coincides with point 149.

The axis of shaft 146 is parallel to the axis of the work. Shaft 146 is journaled in the swivel member 142 by two bearings 172, 173. Miter gear 150 is keyed to this shaft 146, and may be secured axially thereon by abutment against the inner race of ball bearing 172, and by a screw 174.ABgear 150 is assembled after the two gears 151, 151' are in place, by engaging it from the front with the gears 151, 151' and then turning it about the common axis of said gears until in line with shaft 146. This shaft is then brought forward axially into the bore of the gear 150.

Shaft 146 is driven by a helical change gear 176 secured to a flange member 177 which is free to turn on the end of shaft 146. This flange member is connected with said shaft through a sleeve 180 slidably keyed to shaft 146. There is a fine-toothed clutch 181 between the sleeve and the flange member, so that the timing of the face hob may be changed with the said toothed clutch. The clutch is kept in rigid engagement by a nut 182 threaded onto the end of the shaft 146.

In the modification indicated in Fig. 22, the gear 176 is made axially adjustable with respect to miter gear 150, to increase the working range of a given machine. Aside from this modification everything else in the machine may be kept as described.

In this modification the helical gear 176 is mounted on a flange member 277 connected to the shaft 246 by a sleeve 280 slidably keyed to said shaft and by a fine-tooth clutch 181 interposed between the sleeve and the flange member. The flange member 277 is mounted on the shaft 246 and is journaled in a ball bearing 273 held by a tubular part 182 keyed to and axially slidable in the outer member 266 of the cutter assembly. Part 182 can be adjusted and clamped in any suitable known way. Clamping can, for instance, be accomplished by setscrews, of which one is shown at 183. Clutch 181 is kept in rigid engagement by a yoke 184 applied against sleeve 280 and kept under axial pressure by screws 185 that thread into the flange member 277. Shaft 246 takes the place of the shaft 146 of the structure shown in Fig. 18; and member 266 takes the place of member 166 of that structure.

*Work head*

The work 60 is secured to an arbor 186 (Fig. 20) clamped to the work spindle 187 in known manner. The clamping rod 188 is shown tightened mechanically by means of a screw 190, but may be operated hydraulically. Rigidly secured to the outer end of the work spindle 187 is a cylindrical gear 191 preferably provided with helical teeth 192. The spindle 187 is rotatably mounted in the work slide 193 by bearings 194, 195. The work slide 193 is movable in the direction of the work axis 61 along guides 196 (Fig. 21) rigid with the machine frame 197. The work slide motion is used both for feed and for withdrawing the work axially to unloading and loading position. It is operated by a hydraulic piston 198 through a linkage 201. Piston 198 reciprocates in a cylinder 200 provided in the frame 197. For in-feed, pressure is supplied to the right hand side of the piston; for out-feed, to the left-hand side.

The in-feed is controlled by a wedge 202, shown also in Fig. 16. The work head has a projection with an inclined face 203 (Fig. 16) that cooperates with this wedge. The work head is shown in loading position with its plane face 203 separated from the wedge 202. In cutting position, the face 203 is in contact with the wedge. The wedge is movably mounted in the machine frame 197. The in-feed is controlled by the movement of the wedge in a direction parallel to its side 204 and perpendicular to the drawing plane of Fig. 20. For in-feed the wedge is fed out in a direction from the small end of the taper toward the large end, while the hydraulic pressure forces the work slide in as far as the wedge will let it go.

The wedge is moved very slowly by a pinion 205 (Fig. 20) which engages rack teeth 206 provided on the front side of the wedge. Pinion 205 is rigidly secured to a vertical shaft 207 driven from the feed train by miter gears 208. The feed train will be described completely in connection with the drive diagram of Fig. 23.

Cylindrical gear 191 receives motion from a pinion 210 provided at the end of a shaft 211. This pinion is made extra long so as to keep in mesh with the gear when the work slide moves out to loading position.

*The timing train*

The work spindle and the face hobs are timed with each other, that is, they rotate in timed relation at the ratio of the number of starts, or blade groups, of the hobs to the number of teeth to be cut in the work. This is the exact ratio at an infinitely slow feed. The turning positions of the two hobs are independently changed somewhat as the feed progresses to attain the feed effect described with reference to Figs. 11 (right) and 12 (left). When gear 191 of the work spindle has helical teeth, the lead of these teeth has also some effect on the timing during the depth feed. At given turning positions of the gear at the start and at the end of the depth feed, the corresponding turning positions of the hob are determined to achieve the desired feed effect. This can be done with known methods of mathematics, or it can be determined by trial on the machine. The timing changes of the two hobs are obtained by axial displacement of widefaced herringbone gears 214 and 215, respectively (Figs. 16 and 23). The displacements are operated from the feed train.

Motion is imparted to shaft 211 (Figs. 20 and 23) by a motor 216 (Fig. 23) through change gears 217 and gears 218, 219, 220. Pinion 210, which is secured to one end of the shaft 211, drives the gear 191 which is secured to the work spindle. Secured to shaft 211 at its opposite end is a helical change gear 221 that meshes with another helical gear 222 which is vertically adjustable, see also Fig. 17. This gear meshes with the herringbone gears 214, 215 (Figs. 23 and 16). The herringbone gears 214 and 215, in turn, mesh with the helical change gears 176 of the respective cutter drives. The drive to each cutter or hob is from its associated gear 176 through miter gears 150, 151, tapered pinion 136, and drive gear 132. The herringbone gears 214, 215 are mounted on slides 223 (Fig. 17) which are feedable in axial direction along guides 224. These are adjustable relative to the machine frame laterally as well as vertically so that the herringbone gears can always be placed in mesh with the gears 176 as well as gear 222.

The tooth ratio of gears 176 and 221 equals the product of the machine constant and the ratio of the number of starts in a hob to the number of teeth in the work, as is readily understood.

I have indicated a way of taking out backlash in the cutter drive. While the structure is novel, the principle of taking out backlash is old. If desired it may also be applied to other portions of the timing train or to the whole timing train.

The two cutter assemblies may be made either exactly alike or symmetrical to one another.

The feed drive

Mounted on shaft 211 rigidly therewith is a worm 225 (Fig. 23) which meshes with a worm gear 226. The latter is secured to a shaft 227 and imparts slow motion to another worm 228 through change gears 230, a differential 231, shaft 232, and worm 233. Worm gear 228 is secured to a shaft 234, which moves the wedge 202 through miter gears 208 and a rack and pinion. At its opposite end shaft 234 has a gear 235, which drives screws 236, 237 through change gears 238, 240, respectively, and further gears not shown. The screws operate the slides 223 (Fig. 17) of the herringbone gears 214, 215.

During the cutting process the said slides are moved continuously from one end position to another end position; and the work slide is fed into full depth. These slides are returned to their starting positions before cutting a new blank. This return may be accomplished in any suitable known way as by rotating differential 231, which is normally locked.

The slides

Figure 17:
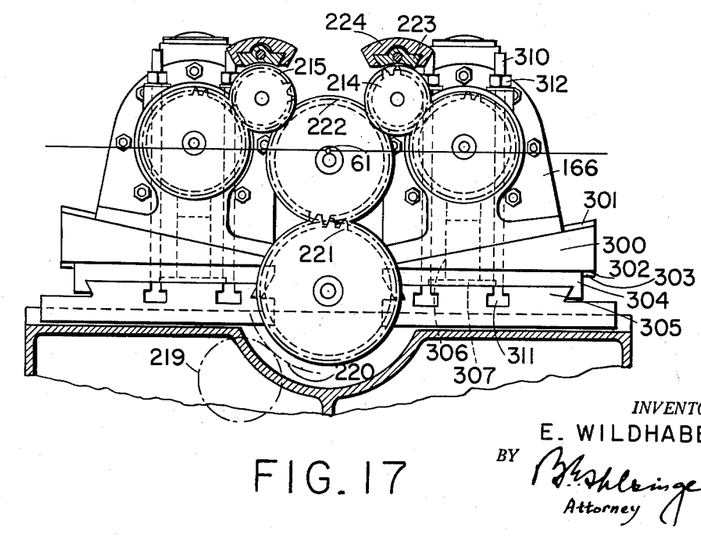
Fig. 17 is partly a section along the line 17—17 of Fig. 16, partly a view, looking in the direction of the arrows.

The outer member or saddle 166 of each cutter assembly rests on a wedge member 300 (Figs. 17 and 16). The upper side of each wedge member is inclined, while the lower side is horizontal. The upper side of each wedge member is provided with a guiding tongue 301. The lower side of each wedge member also contains a tongue, denoted at 303, which engages a slide 304 that is adjustable in the direction parallel to the work axis on another slide 305. Slide 305 is laterally adjustable in a direction perpendicular to the work axis; and wedge members 300 are adjustable in this same direction. The slides 304, 305 associated with the two cutter assemblies provide adjustment anywhere in a horizontal plane, independently for each cutter assembly. Wedge members 300 provide independent vertical adjustments for the two cutter assemblies. A vertical cylindrical member 306 with flange 307 is secured to each slide 304. Each of these members 306 extends through an opening in the associated wedge member 300 into a matching cylindrical bore provided in the associated outer or saddle member 166. Accordingly, when a wedge member 300 is moved horizontally, the associated saddle member 166 is constrained to move vertically. Thus, when a wedge member 300 is moved inwardly to raise member 166, it will raise it vertically, without moving it horizontally.

The provision of a direct vertical adjustment with a wedge member not only simplifies the machine set up, but it also permits bolting each outer or saddle member 166 directly to its slide 305, and thus adds to the rigidity. This is done with T-bolts 310 (Fig. 17). The T-bolts 310 extend through bores provided in outer or saddle members 166 and in the slides 304, and through slots provided in wedge members 300. They reach into T-slots 311 of the slides 305. They are tightened by nuts 312.

A tightening connection may be provided between the spherical outside surface of holder 135 and slide 304 through a single intermediate member, for added rigidity.

Adjustments of the wedge members 300 and of the slides 304 may be made with screws ordinarily employed for such adjustments, and not shown.

When the full depth is reached or almost reached, the whole timing train is slowed down, so that the cutting speed is drastically reduced to attain a good surface finish without tears. The broad idea of slowing down is not novel with this invention. It is only particularly well suited to face hobbing. Structure for this purpose is known, and does not need to be described.

If desired, the depth feed may be stopped immediately before finishing by stopping the timing train. Moreover, the timing of the two hobs may be altered to effect light finishing cuts. Structure to this end can be devised by applying the knowledge of the art.

Thus far the invention has been described particularly with reference to face hobbing. It can also be practiced by face milling, in which case the work is stationary during the cut, and is periodically indexed.

Face milling

One feature of the present invention is to cut all the tooth spaces to the major portion of their depth before finishing starts on any tooth space. This procedure is beneficial so far as accuracy of the finished gears is concerned.

Applied to face-milling, this means that several separate cuts are taken on each tooth space, each cut being taken on all the tooth spaces before the next cut starts. Preferably gap-type face mill cutters are used for this purpose, which cut in each tooth space while making slightly less than a full turn, and then pass on to the next tooth space. A cutter of this type is indicated in Figs. 24 and 25. Outside and inside cutting teeth 400, 401, respectively, are formed on a ring 402 which has a shoulder 403. The ring is secured to a cutter body 404 by a disc 405 applied to shoulder 403 of the ring and pressed toward the cutter body by a nut 406. The ring is secured against angular movement relative to the cutter body by one or more keys 407. There is a gap 408 between the cutting teeth 400 and 401'.

The cutting teeth, 400, 401, shown, have oppositely inclined cutting faces to provide side rake. Cutters all of whose blades or teeth are sharpened alike may also be used.

A view in the direction of the work axis 410 is afforded by Fig. 26, which is similar to Fig. 21, but applies to face mills. The pair of gap-type cutters is indicated each by the circular center line 409, 409', of the blade tops, shown in dotted lines. The cutters engage the work 411 in opposite zones 412, 413. The cutters are timed so that their gaps 408 are at the cutting zones at the same time. In this position the work is indexed.

When gap-type cutters are used, the work is indexed once for each cutter revolution. A depthwise feed cycle, comprising feed and withdrawal, is used during each cutter revolution until all the tooth spaces have been cut to the same depth. The feed cycle is then shifted to provide a deeepr cut the next time around. The new feed cycle starts where the previous one left off. This goes on until full tooth depth is reached.

The feed per cutter turn can also be built into the cutter if desired. The cutting teeth are then arranged at different depthwise positions, their tops being progressively advanced depthwise on successive blades or teeth. In this case, the depthwise position of the cutters is changed only after all the teeth have been cut to the same depth.

With the use of a gap-type cutter, as with face hobs, during the progress of cutting the cutting stages are always more nearly alike on all teeth of the work than with conventional face mill cutting, and maximum accuracy is attained. However, part of the invention can also be practiced with full face-mill cutters which have no gaps. In this case the teeth may be roughed out to their full depth before other teeth are started on. Depth feed is provided to full depth, while each cutter goes through more than one revolution. It may perform two or more revolutions per cycle, and not necessarily an integral number of revolutions. After all the teeth have been cut to full depth in this way, the finishing cycle begins. Each cutter then may make a fraction of a turn or a full revolution per tooth.

In all cases, the depth feed contains preferably a component in the direction of the work axis which may be performed by the work. Feed along the work axis alone, however, would not give the desired and described feed path. The cutters would follow more the longitudinally convex sides of the gear teeth, sides 71 of Fig. 5. The feed path could be balanced on the two cutters, so that each follows the center line of the tooth space by also turning the gear on its axis, as it is fed in. As the work is fed in while being turned only about its axis, however, each cutter would move toward the side it is to finish at too large a rate, as compared with the depth feed rate. To obtain a feed path on each cutter following more the side the cutter is to finish, a further displacement component is provided. To effect the slow approach desired, the work should be moved away from the cutter, as it is fed in, preferably in a direction lying in the mean normal plane of the side worked on. Inasmuch as the two sides worked on are diametrically opposite or nearly so, their normal planes are nearly parallel to each other. Accordingly, a single direction will fulfill the requirements of both cutters. In accordance with my invention, the gear is fed into depth about and along an axis 415 eccentric of work axis 410 in counterclockwise direction so that the work axis moves up in the drawing.

The cutter at the right in Fig. 26 contains the outside finishing blades, and the one at the left contains the inside finishing blades. The upward feed motion of the work lets the outside blades of the cutter 409 at the right follow the longitudinally concave tooth sides of the work more than the other tooth sides. It also lets the inside cutting blades of the cutter 409' at the left follow the longitudinally convex tooth sides of the work more than the opposite sides. In other words, through this arrangement, whereby the work is fed along and about an axis 415 parallel to the work axis, the desired feed direction may be achieved on both cutters.

Except for the modified feed and the intermittent indexing of the work, a machine using face mill type cutters, rather than face type hobs, is very similar to the machine previously described. In the face-mill machine, also, each cutter is tiltable about two axes intersecting in the cutter axis, that is, adjustable in all directions within the design limits about a pivot point lying on the cutter axis. 418, 419 (Fig. 26) are the pivot points for the two face-mill cutters, while points 420, 421 are the centers of the circular center lines of the blade tops. In the face-mill machine, also, the cutter axes 418—420 and 419—421 are both inclined to a horizontal plane, and pivot points 418, 419 are kept at nearly the same vertical height. Here, also, wedge members 300 are preferably used for attaining vertical adjustment of the cutter spindles.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. The method of producing longitudinally curved tooth tapered gears having spirally-arranged teeth, which comprises engaging a pair of rotary face hobs with a tapered gear blank on opposite sides of the axis of the blank with the axes of said hobs angularly disposed to and offset from each other, and rotating the gear blank continuously on its axis while rotating said hobs in timed relation with the rotation of the blank and while effecting a feeding motion between said hobs and blank in which one hob follows more one side of the teeth of the blank than the other side while the other hob follows more the other side of the teeth until said hobs reach full-depth cutting position in which the cutting edges of each hob describe respectively the sides of the teeth which they have followed during said feed motion.

2. The method of successively rough-cutting and finish cutting longitudinally curved teeth in the face of a toothed member that has teeth spaced angularly about its axis, which comprises engaging a pair of rotary face hobs with a work blank on opposite sides of the axis of the blank with their axes angularly disposed to and offset from each other, and rotating the blank continuously on its axis while rotating said hobs in timed relation with the rotation of the blank, and while effecting a generally depthwise feed motion between said hobs and blank, and varying the timing of the rotation of each hob relative to the rotation of the blank during said feed motion so that during said feed motion one hob follows more one side of the teeth of the blank than the other side of the teeth while the other hob follows more said other side of the teeth, until said hobs reach full-depth cutting position in which the cutting edges of each hob describe respectively the sides of the teeth which they have followed during said feed motion.

3. The method of successively rough-cutting and finish cutting longitudinally curved teeth in the face of a toothed member that has teeth spaced angularly about its axis, which comprises engaging a pair of rotary face hobs with a work blank on opposite sides of the axis of the blank with their axes angularly disposed to and offset from each other, and rotating the gear blank continuously on its axis while rotating said hobs in timed relation with the rotation of the blank, and while effecting a feed motion between the hobs and blank in the direction of the axis of the blank, and varying the timing of rotation of each hob relative to the rotation of the blank during said feed motion so that during said feed motion one hob follows more one side of the teeth of the blank than the other side of the teeth while the other hob follows more said other side of the teeth, until said hobs reach full depth cutting position in which the cutting edges of each hob describe respectively the sides of the teeth which they have followed during said feed motion.

4. The method of successively rough-cutting and finish cutting longitudinally curved teeth on tapered gears, which comprises engaging a pair of rotary face type cutters with a tapered gear blank on opposite sides of the axis of the blank with the axes of the cutters angularly disposed to and offset from each other and so that the apex of the blank lies outside the cutting paths of both cutters, and rotating said cutters in engagement with the blank, while effecting a feeding motion between said cutters and said blank in which one cutter follows more one side of the teeth of the blank than the other side while the other cutter follows more the other side of the teeth, thereby to cut the major part of the depth of all the teeth, and then in the same operation finish cutting with each cutter the side of the teeth which the respective cutter has followed during said feed motion by causing the two cutters to describe, respectively, the sides of the teeth which they followed.

5. The method of cutting longitudinally curved tooth tapered gears which comprises engaging a pair of rotary face type cutters with a rotary tapered gear blank on opposite sides thereof so that the cutter axes are angularly disposed to and offset from each other and so that the apex of the blank lies outside the cutting paths of both cutters, and rotating said cutters in engagement with the blank, while effecting a feeding motion between the cutters and blank toward a position in which a cutting edge of one cutter describes one tooth side of the blank and in which a cutting edge of the other cutter describes an opposite tooth side of the blank, said feeding motion including a motion in the direction of the blank axis and an additional motion such that said one cutter follows more said one side of the teeth during feed than the other side of the teeth, while said other cutter follows more said other side of the teeth, said feeding motion being at a rate such that all of the teeth of the gear are cut to the major part of their depth before the final cut is applied to any one tooth side.

6. The method of successively rough-cutting and finish cutting longitudinally curved tooth tapered gears which comprises engaging a pair of face hobs with a tapered gear blank on opposite sides thereof so that the axes of the hobs are angularly disposed to and offset from each other, and rotating said gear blank continuously on its axis while rotating said hobs in timed relation with the rotation of said blank, and while effecting a feeding motion between said hobs and said blank toward positions in which cutting edges of one hob describe one side of the teeth of the blank and cutting edges of the other hob describe the other side of said teeth, said positions being so located about the blank axis that the cutting edges of both hobs enter into final contact with the opposite tooth sides at the same instant and leave such contact at the same instant, thereby avoiding marking the tooth sides.

7. The method of successively rough-cutting and finish cutting longitudinally curved tooth tapered gears having spirally-arranged teeth which comprises engaging a pair of face hobs with a tapered gear blank on opposite sides thereof so that the axes of the hobs are angularly disposed to and offset from each other, and rotating said blank continuously on its axis while rotating said hobs in timed relation with the rotation of said blank, and while effecting a feeding motion between said hobs and said blank toward positions in which cutting edges of one hob describe one side of the teeth of the blank and cutting edges of the other hob describe the other side of said teeth, said feeding motion being such that said one hob follows more said one side of the teeth than the other side thereof while the other hob follows more said other side of the teeth, and slowing down hob and blank rotations upon approaching said positions, thereby to achieve improved finish on the tooth sides being cut.

8. The method of successively rough-cutting and finish cutting longitudinally curved tooth tapered gears having teeth increasing in depth toward their outside ends, which comprises engaging a pair of face hobs, that have cutting edges at opposite sides, with a tapered gear blank on opposite sides thereof so that the hob axes are angularly disposed to and offset from one another, and rotating the blank continuously on its axis while rotating said hobs in timed relation with the rotation of the blank, while effecting a feeding motion between said hobs and the blank toward positions in which cutting edges at one side of one hob describe one side of the teeth of the blank and cutting edges at one side of the other hob describe the other side of said teeth, and chamfering said teeth at their tops with said hobs in the same operation, each hob chamfering the side of the teeth opposite that, which the hob describes, and with cutting edges opposite those that describe the said side of the teeth.

9. The method of producing a pair of longitudinally curved tooth tapered gears that have angularly disposed axes and consisting of a relatively flat gear and a tapered pinion which has fewer teeth than said relatively flat gear and both of which have teeth tapering in depth from end to end, which comprises cutting both sides of the pinion teeth simultaneously in one operation with a single face hob that has opposite side cutting edges by rotating said hob and the pinion blank on their respective axes continuously in timed relation, and cutting both sides of the gear teeth simultaneously in one operation with a pair of face hobs that have, respectively, opposite side finish-cutting edges and that are disposed, respectively, at opposite sides of the gear by rotating the two hobs of said pair and the gear blank on their respective axes continuously and in timed relation so that each tooth surface of the gear is the relative path of a cutting edge lying in that tooth surface, the hob used in cutting the teeth on at least one member of the gear pair having its finish-cutting edges inclined forwardly from their bottoms to their tips, thereby to control the pressure angle produced along the length of teeth of said one member of the gear pair to obtain the desired shape of tooth bearing between mating tooth surfaces of the gear pair.

10. The method of cutting a longitudinally curved tooth tapered gear which comprises engaging a pair of face mill cutters with a tapered gear blank on opposite sides of its axis and with the cutter axes angularly disposed to and offset from each other and with the apex of the blank lying outside the cutting paths of both cutters, and rotating said cutters in engagement with the blank while providing depthwise feeding motion between said cutters and the blank to a position in which a cutting edge of one cutter describes one side of a tooth of the blank and a cutting edge of the other cutter describes the other side of a tooth, said cutters being rotated in time with each other and with cutting edges of the respective cutters leaving the ends of each tooth space of the blank simultaneously in said final positions, said feeding motion being such that the cutting edges of said one cutter follow more said one side of the tooth than the other side, while the cutting edges of the other cutter follow more said other side, and disengaging both cutters from the blank simultaneously, and then indexing the blank.

11. The method of cutting a longitudinally curved tooth tapered gear which comprises engaging a pair of face-mill cutters with a tapered gear blank on opposite sides thereof with the cutter axes angularly disposed to and offset from each other and with the apex of the blank lying outside the cutting paths of both cutters, each of said cutters having a row of cutting blades arranged about its axis with a gap between the last and first blades of said row, rotating said cutters in engagement with the blank so that the gaps in the two cutters register simultaneously with the blank, and effecting a step-by-step depthwise feed motion between said cutters and said blank toward positions in which a cutting edge of one cutter describes one side of the teeth of the blank, and a cutting edge of the other cutter describes the other side of said teeth, a fraction only of the total depth of a tooth space of the blank being cut on each revolution of the cutters, and the blank being indexed on each revolution of the cutters while said gaps are abreast of the blank, and the cutters being fed depthwise a step after each indexing revolution of the blank while the cutters continue to revolve, so that all the teeth of the blank are cut for the major part of their depth before the final cut is applied to any tooth side of the blank.

12. The method of cutting longitudinally curved tooth tapered gears which comprises engaging a pair of rotary face-type cutters with a rotary, tapered gear blank on opposite sides thereof with the axis of each cutter tilted about a central point on the cutter axis so that the cutter axis is offset from the axis of the blank and the apex of the blank lies outside the cutting paths of both cutters, and with said central point of each cutter axis disposed at a distance less than half the amount of said offset from a horizontal plane containing the blank axis, and rotating said cutters in engagement with the blank, while effecting feeding motion between said cutters and the blank toward the root surface of said blank to apply the tooth shape to opposite side tooth surfaces of the teeth upon reaching said root surface.

13. The method of cutting a pair of longitudinally curved tooth tapered gears consisting of a gear and pinion, said pinion having fewer teeth than said gear, which comprises cutting both sides of the pinion teeth simultaneously in one operation with a single face hob, that has opposite side finish-cutting edges, by rotating said hob in engagement with the pinion blank while rotating said pinion blank continuously on its axis in timed relation with said hob, and while simultaneously effecting a relative rolling motion between said hob and said pinion blank to generate the sides of the pinion teeth, and cutting both sides of the teeth of the gear blank simultaneously by rotating a pair of face hobs, which have finish cutting edges at opposite sides, respectively, in engagement with the gear blank with the two hobs of said pair disposed, respectively, at opposite sides of the axis of said gear blank with their axes angularly disposed to and offset from each other, while rotating the gear blank continuously on its axis in time with the rotation of said two hobs, and while effecting a relative feed motion between said two hobs and said gear blank to positions in which a cutting edge of one of said two hobs describes one side of the gear teeth and in which a cutting edge of the other hob describes the other side of said gear teeth, and varying the timing of the rotation of each of said two hobs relative to said gear blank during said feed motion.

14. The method of cutting a pair of longitudinally curved tooth tapered gears consisting of a gear and pinion, said pinion having fewer teeth than said gear, which comprises cutting both sides of the pinion teeth simultaneously in one operation with a single face hob, that has opposite side finish-cutting edges, by rotating said hob in engagement with the pinion blank while rotating said pinion blank continuously on its axis in timed relation with said hob, and while simultaneously effecting a relative rolling motion between said hob and said pinion blank to generate the sides of the pinion teeth, and cutting both sides of the teeth of the gear blank simultaneously by rotating a pair of face hobs, which have finish cutting edges at opposite sides, respectively, in engagement with the gear blank with the two hobs of said pair disposed, respectively, at opposite sides of the axis of said gear blank with their axes angularly disposed to and offset from each other, while rotating the gear blank continuously on its axis in time with the rotation of said two hobs, and while effecting a relative feed motion between said two hobs and said gear blank to positions in which a cutting edge of one of said two hobs describes one side of the gear teeth and in which a cutting edge of the other hob describes the other side of said gear teeth, and varying the timing of the rotation of each of said two hobs relative to said gear blank during said feed motion, the variation in timing being different for said two hobs.

15. A machine for cutting teeth in a process in which the tool is fed depthwise relative to the blank and in which each side tooth surface of the blank is described by a cutting edge lying in said surface, comprising a rotatable work support, a pair of rotatable cutter spindles for supporting a pair of face-type cutters, means for angularly adjusting each cutter spindle about a pivot to set the cutter spindles angularly with respect to the axis of the work support and to each other, means for effecting straight line adjustments of said pivots, means for rotating said cutting spindles, means for rotating the work support on its axis, and means for effecting a depthwise feeding motion between said cutter spindles and work support comprising two components, one of which is in the direction of the axis of the work support.

16. A machine for cutting teeth in a process of depthwise feed in which in final feed position each side tooth surface is described by a cutting edge lying in said surface, comprising a rotatable work support, a pair of rotatable cutter spindles for supporting a pair of face-type cutters, means for angularly adjusting each cutter spindle about two axes, means for effecting straight line adjustment of each cutter spindle in three different directions, means for rotating said cutter spindles, means for rotating said work support, and means for imparting depthwise feed motion to the work support in the direction of its axis.

17. A machine for cutting teeth in a process of depthwise feed in which in final feed position each side tooth surface is described by a cutting edge lying in said surface, comprising a rotatable work support, a pair of rotatable cutter spindles for supporting a pair of face-type cutters, means for angularly adjusting each cutter spindle about a point lying on its axis, a cross slide on which each cutter spindle is mounted, a slide on which each of the cross slides is mounted, all of said slides being adjustable in directions lying in a fixed plane containing the axis of the work support, means for adjusting the distance of each cutter spindle from said plane, means for rotating both cutter spindles, means for rotating the work support, and means for providing depthwise feed between said cutter spindles and said work support.

18. A machine for cutting teeth in a process of depthwise feed in which in final feed position each side tooth surface is described by a cutting edge lying in said surface, comprising a rotatable work support, a pair of rotatable cutter spindles for supporting a pair of face-type cutters, means for angularly adjusting each cutter spindle about a point lying on its axis, a cross slide on which each cutter spindle is mounted, a slide on which each of the cross slides is mounted, all of said slides being adjustable in directions lying in a fixed plane containing the axis of the work support, a wedge member adjustable on each of said cross slides for changing the distance of the corresponding cutter spindle from said plane, means for rotating both said cutter spindles, means for rotating said work support, and means for effecting depthwise feed movement between said cutter spindles and said work support.

19. A machine for cutting teeth in a process of depthwise feed in which in final feed position each side tooth surface of the blank is described by a cutting edge lying in said surface, comprising a frame, a work support mounted in said frame for rotation about a horizontal axis, a pair of cutter spindles rotatably mounted on said frame for supporting a pair of face-type cutters, means for angularly adjusting each cutter spindle about a point lying on its axis, means for adjusting both cutter spindles in a horizontal plane, an adjustable wedge member for adjusting the vertical distance of each cutter spindle from said plane, means for rotating said cutter spindles, means for rotating said work support, and means for effecting depthwise feed movement between said cutter spindles and said work support.

20. A machine for cutting teeth in a process of depthwise feed in which in final feed position each side tooth surface of the blank is described by a cutting edge lying in said surface, comprising a frame, a work support mounted in said frame for rotation about a horizontal axis, a pair of hob spindles rotatably mounted on said frame for supporting a pair of face hobs, means for adjusting each hob spindle angularly, means for adjusting both hob spindles rectilinearly in a plurality of directions lying in a plane containing the axis of the work support, means for adjusting the distance of said hob spindles from said plane, means for rotating said hob spindles and said work support in timed relation, means for effecting depthwise feed movement between said hob spindles and said work support in the direction of the axis of said work support, and means for continuously changing the timing of the rotations of said hob spindles independently of one another relative to the rotation of said work support and at different rates.

21. A machine for cutting teeth in a process of depthwise feed in which in final feed position each side tooth surface of the blank is described by a cutting edge lying in said surface, comprising a frame, a work support rotatably mounted on said frame, a pair of cutter spindles rotatably mounted on said frame for supporting a pair of face-type cutters, means for angularly adjusting each cutter spindle about two axes which intersect on the axis of the cutter spindle, one of said two axes being parallel to the axis of the work support, means for effecting straight-line adjustment of each cutter spindle in a plurality of different directions, means for rotating said cutter spindles, means for rotating said work support, and means for effecting depthwise feed movement between said cutter spindles and said work support.

22. A machine for cutting teeth in a process of depthwise feed in which in final feed position each side tooth surface of the blank is described by a cutting edge lying in said surface, comprising a frame, a work support rotatably mounted on said frame, a cutter spindle rotatably mounted on said frame for supporting a face-type cutter, means for angularly adjusting said cutter spindle about two different axes, one of which is parallel to the axis of said work support, means for effecting rectilinear adjustment of said cutter spindle in two directions lying in a fixed plane containing the axis of said work support, means for rotating said cutter spindle, means for rotating said work support, and means for effecting depthwise feed movement between said cutter spindle and said work support.

23. A machine for cutting teeth in a process of depthwise feed in which in final feed position each side tooth surface of the blank is described by a cutting edge lying in said surface, comprising a frame, a work support rotatably mounted on said frame, a pair of cutter spindles rotatably mounted on said frame, a face hob secured to each cutter spindle to rotate therewith, means for rotating said work support, means for rotating the two cutter spindles in timed relation with the rotation of said work support, means for effecting a relative depthwise feed movement between said cutter spindles and said work support, and means for individually varying the timing of the rotation of the two cutter spindles relative to the rotation of said work support during said feed movement so that the two cutter spindles rotate in different timed relation with the rotation of said work support during said feed movement.

24. A machine for cutting teeth in a process of depthwise feed in which in final feed position each side tooth surface of the blank is described by a cutting edge lying in said surface, comprising a frame, a work support rotatably mounted on said frame, a pair of cutter spindles rotatably mounted on said frame, a face hob secured to each cutter spindle to rotate therewith, means for rotating said work support, means for rotating the two cutter spindles in timed relation with the rotation of said work support, means for effecting a relative depthwise feed movement between said cutter spindles and said work support in the direction of the axis of said work support, and means for individually varying the timing of the rotation of the two cutter spindles relative to the rotation of said work support during said feed movement so that the two cutter spindles rotate in different timed relation to said work support during said feed movement.

References Cited in the file of this patent

UNITED STATES PATENTS

| | | |
|---|---|---|
| 1,349,951 | Gleason et al. | Aug. 17, 1920 |
| 1,940,703 | Stewart | Dec. 26, 1933 |
| 1,977,765 | Johanson | Oct. 23, 1934 |
| 2,127,779 | Mammano | Aug. 23, 1938 |
| 2,145,000 | Wildhaber | Jan. 24, 1939 |
| 2,329,804 | Wildhaber | Sept. 21, 1943 |
| 2,406,009 | Forster | Aug. 20, 1946 |
| 2,505,269 | Wildhaber | Apr. 25, 1950 |
| 2,510,528 | Soper | June 6, 1950 |
| 2,648,894 | Wildhaber | Aug. 18, 1953 |

FOREIGN PATENTS

| | | |
|---|---|---|
| 677,321 | Great Britain | Aug. 13, 1952 |
| 915,474 | France | July 22, 1946 |
| 1,055,003 | France | Oct. 14, 1953 |
| 1,091,359 | France | Oct. 27, 1954 |